United States Patent [19]

Arora

[11] 4,256,441
[45] Mar. 17, 1981

[54] FLOATING RING BEARING STRUCTURE AND TURBOCHARGER EMPLOYING SAME

[75] Inventor: Gulshan K. Arora, Indianapolis, Ind.

[73] Assignee: Wallace-Murray Corporation, Indianapolis, Ind.

[21] Appl. No.: 50,102

[22] Filed: Jun. 19, 1979

[51] Int. Cl.³ .............................................. F04B 35/00
[52] U.S. Cl. ................................. 417/407; 308/237 R
[58] Field of Search ............... 417/406, 407, 408, 409; 308/9, 122, 237 R, 237 A

[56] References Cited

U.S. PATENT DOCUMENTS

| 3,390,926 | 7/1968 | Woollenweber | 308/122 |
| 3,993,370 | 11/1976 | Woollenweber | 308/9 X |

Primary Examiner—Christopher K. Moore

Attorney, Agent, or Firm—Woodard, Weikart, Emhardt & Naughton

[57] ABSTRACT

A bearing structure including a bearing housing, a thrust sleeve retained within the bearing housing, a pair of bearing sleeves received within the bearing housing on opposite sides of the thrust sleeve, and a shaft received within the thrust sleeve and bearing sleeves. The thrust sleeve is retained in a manner to permit movement of the thrust bearing relative the bearing housing to correspond with movement of the bearing sleeves to maintain parallelism between the associated end bearing surfaces on the thrust sleeve and bearing sleeves. A bearing structure for receiving radial and axial thrust loads and a turbocharger employing the described bearing structures are also disclosed.

15 Claims, 2 Drawing Figures

FLOATING RING BEARING STRUCTURE AND TURBOCHARGER EMPLOYING SAME

BACKGROUND OF THE INVENTION

1. Field of the Invention

The present invention relates to the field of bearing structures for rotatable shafts subjected to radial and axial loads, and in a particular aspect to turbocharger bearing structures.

2. Description of the Prior Art

A number of bearing structures have been proposed for use with rotatable shafts which are also subjected to axial thrust loads. When the shaft rotates at high speeds, the problems encountered with such bearing structures are significant. One particular field in which bearing structures have been proposed for shafts rotating at very high speeds is in the field of turbochargers. The shafts for turbochargers may exceed 150,000 revolutions per minute, and it is important under these circumstances to provide a bearing structure which is simple in construction and easily serviced, but at the same time is durable and will assure proper rotation of the shaft.

In U.S. Pat. No. 3,993,370, issued to Woollenweber on Nov. 23, 1976, there is disclosed a lubricated bearing structure. The Woollenweber patent describes as prior art a bearing assembly which employs a full sleeve tubular bearing rotatably located in a sleeve section of the bearing housing and encircling the shaft. When thrust is transmitted in one direction, the thrust is applied to the sleeve bearing and from the sleeve bearing to a stationary thrust plate. Since the sleeve bearing rotates at a speed less than the shaft speed, the thrust is transmitted between portions which have a lower speed differential than that which exists between the shaft and the stationary plate. However, it is further described that when thrust is transmitted in the opposite direction, the thrust is transmitted from a collar secured to the shaft directly to the thrust plate, thus transmitting the thrust between one portion travelling at the rotational speed of the shaft and a stationary portion. In this respect, inefficiency results and this is considered to be disadvantageous.

The Woollenweber disclosure also relates to a bearing structure which employs two bearings instead of a single sleeve bearing. Separate stationary bearing surfaces are provided for each of the bearings. In this manner, the Woollenweber bearing structure provides for the transmission of a thrust load, in either direction, between members which have a lower speed differential than that which exists between the shaft and stationary plate. In either direction, the thrust load is applied from the shaft to the bearing traveling at a speed less than that of the shaft, and then from the bearing to the stationary bearing plate. In the Woollenweber bearing structure, the stationary bearing surfaces are provided as fixed annular flanges forming a portion of the bearing housing.

A similar bearing structure is shown in U.S. Pat. No. 3,734,650, issued to Reisacher et al. on May 22, 1973. The Reisacher bearing structure differs from that shown in the Woollenweber patent in that the rigid bearing flanges are replaced with a thrust bearing fit within the bearing housing between the pair of sleeve bearings. In either direction, the thrust load is transmitted from the shaft to the bearing sleeve and then from the bearing sleeve to the central thrust bearing.

A similar construction is also shown in U.S. Pat. No. 774,415, issued to Conrad on Nov. 8, 1904. The Conrad patent relates to a vehicle wheel and axle, and describes a housing including a reduced-diameter center portion. The shaft is received through the housing and bearing sleeves are positioned in the housing on opposite sides of the reduced-diameter portion. Thrust loads may be transmitted from the axle to the bearing sleeves and from there to the reduced-diameter portion of the housing.

The present invention provides a bearing housing which in a particular aspect provides a thrust bearing sleeve which is movable within the bearing housing to accommodate movement of the shaft and the bearing sleeves. When the latter occurs, the rigid thrust bearings in the prior art will have their end bearing surfaces non-parallel with the end bearing surfaces of the sleeve bearing. This misalignment will result in poor load carrying capacity of the thrust bearing elements, and is therefore disadvantageous.

SUMMARY OF THE INVENTION

It is an aspect of the present invention to provide a bearing structure which includes a bearing housing, a thrust sleeve retained within the bearing housing, a pair of bearing sleeves within the housing on opposite sides of the thrust sleeve, and a shaft received within each of the thrust sleeve and bearing sleeves. The thrust sleeve is retained in the bearing housing in a manner to limit rotation and axial displacement of the thrust sleeve but to permit movement of the thrust sleeve in response to the position of the inward, end bearing surfaces of the bearing sleeves to provide substantial alignment of the associated end bearing surfaces of the thrust sleeve and the bearing sleeves. In other aspects the present invention can provide a bearing structure for axial thrust in a single direction, or in two directions, and also a turbocharger including a bearing structure of the described type.

It is an object of the present invention to provide a bearing structure which is well suited for use with rotatable shafts subjected to axial thrust loads, and particularly to shafts which rotate at high speeds.

It is a further object of the present invention to provide a bearing structure which is simple and relatively inexpensive in construction, and which is durable.

Another object of the present invention is to provide a bearing structure which is efficient in terms of power loss of the shaft rotating therein.

A further object of the present invention is to provide a bearing structure which allows for the substantial alignment of the thrust bearing surfaces.

It is another object of the present invention to provide a bearing structure for bearing axial thrust loads in a single direction, or in two directions, and transmitted from a rotatable shaft.

A further object of the present invention is to provide a turbocharger assembly which includes a bearing structure of the described type.

DESCRIPTION OF THE PREFERRED EMBODIMENT

Figure 1:
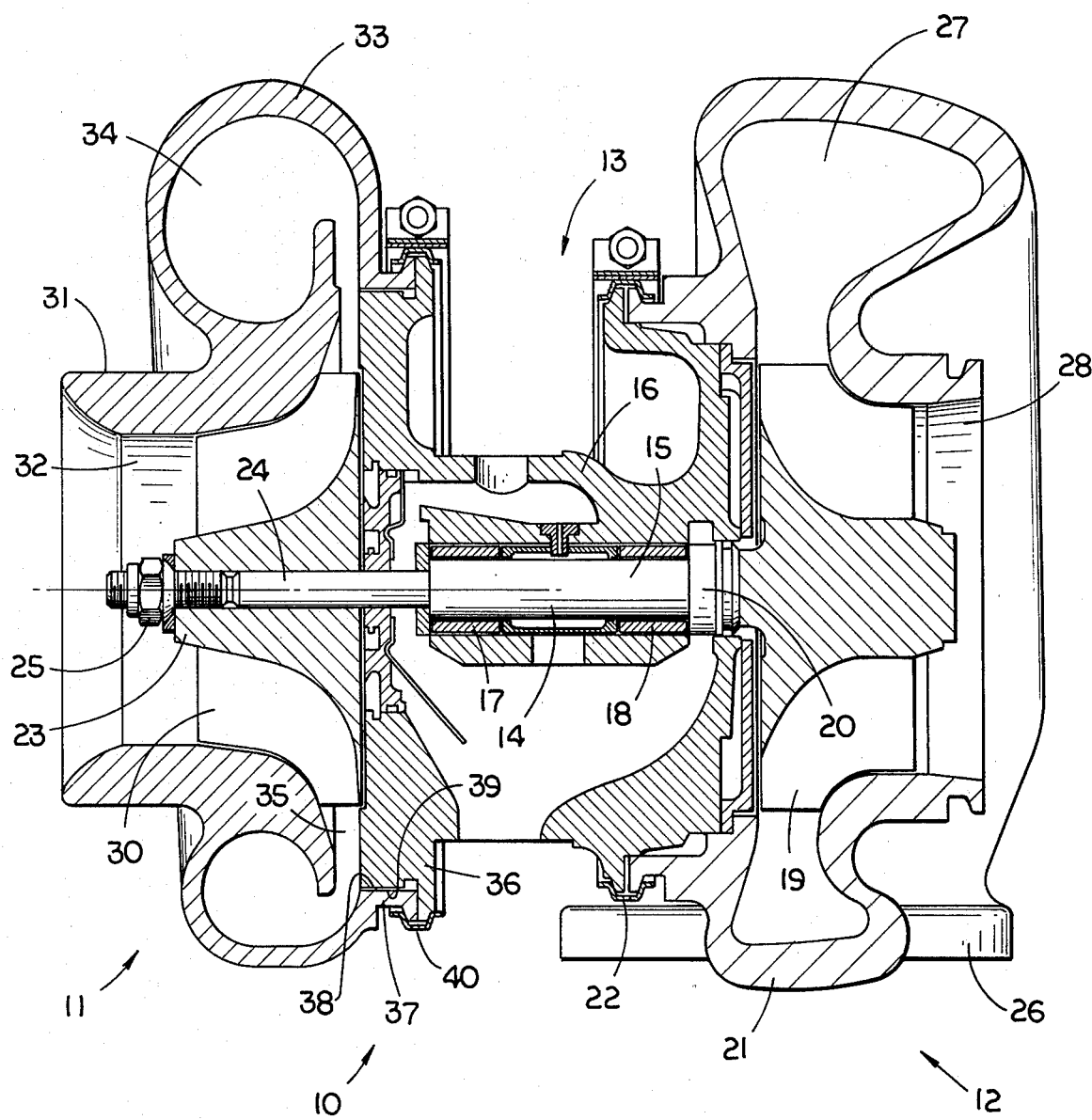
FIG. 1 is a side, cross-sectional view of a turbocharger incorporating a bearing structure constructed in accordance with the present invention.

For the purposes of promoting an understanding of the principles of the invention, reference will now be made to the embodiment illustrated in the drawings and specific language will be used to describe the same. More specifically, the present invention relates to a bearing structure and will be described with respect to a particular application as a component of a turbocharger appropriate for use with internal combustion engines.

Referring now to the figures, there is shown a turbocharger assembly 10 including a compressor assembly 11 and a turbine assembly 12. Bearing housing assembly 13 supports and inter-connects the compressor assembly 11 and the turbine assembly 12.

Assembly 13 includes a shaft 14 having a bearing portion 15 rotatably supported within bearing housing 16 by sleeve bearings 17 and 18. Turbine wheel 19 is connected to an enlarged end 20 of shaft 14 and is received within turbine housing 21 secured to bearing housing 16 by a V-clamp 22. Impeller 23 includes a central bore within which the reduced end 24 of shaft 14 is received, impeller 23 being secured to shaft 14 by locknut 25 which is threadedly received upon the end of shaft 14.

Exhaust gas from the exhaust manifold of an engine to which turbocharger 10 is connected enters turbine housing 21 through turbine inlet 26 and thereafter enters volute 27. The gas enters the turbine wheel 19 around its periphery and expands through exhaust outlet 28. Energy of the exhaust gas is thereby converted to mechanical work, turning turbine wheel 19 and driving shaft 14 and impeller 23. The impeller 23 is used to compress air to increase the amount of air delivered to the engine cylinders above that available in natural aspiration. The compressed air exits compressor 11 through a tangential outlet communicating with passageway 34 and connected to the engine intake manifold or air induction system. As a result, the engine burns more fuel and produces greater power.

Impeller 23 is mounted upon shaft 14 and is operable to rotate therewith. Impeller 23 includes radial fins or blades 30. Compressor cover 31 is attached to bearing housing 16 and defines impeller chamber 32 which closely conforms to the profile of blades 30. Cover 31 further comprises a scroll 33 defining a toroidal or volute passageway 34 which surrounds impeller chamber 32 and communicates therewith through annular diffuser passageway 35. Upon rotation of impeller 23, the fluid to be pressurized is drawn inwardly into impeller chamber 32 by blades 30 and is propelled through diffuser passageway 35 into the volute, outlet passageway 34.

Bearing housing 16 includes a mounting flange 36 which extends adjacent and outwardly beyond the back of impeller 23. Compressor cover 31 includes a mounting flange 37 which extends axially from scroll 33 and which includes a cylindrical pilot surface 38. Pilot surface 38 is received adjacent a complementary, cylindrical surface 39 on mounting flange 36. Mounting flanges 36 and 37, and therefore cover 31 and bearing housing 16, are secured together by V-clamp 40.

Figure 2:
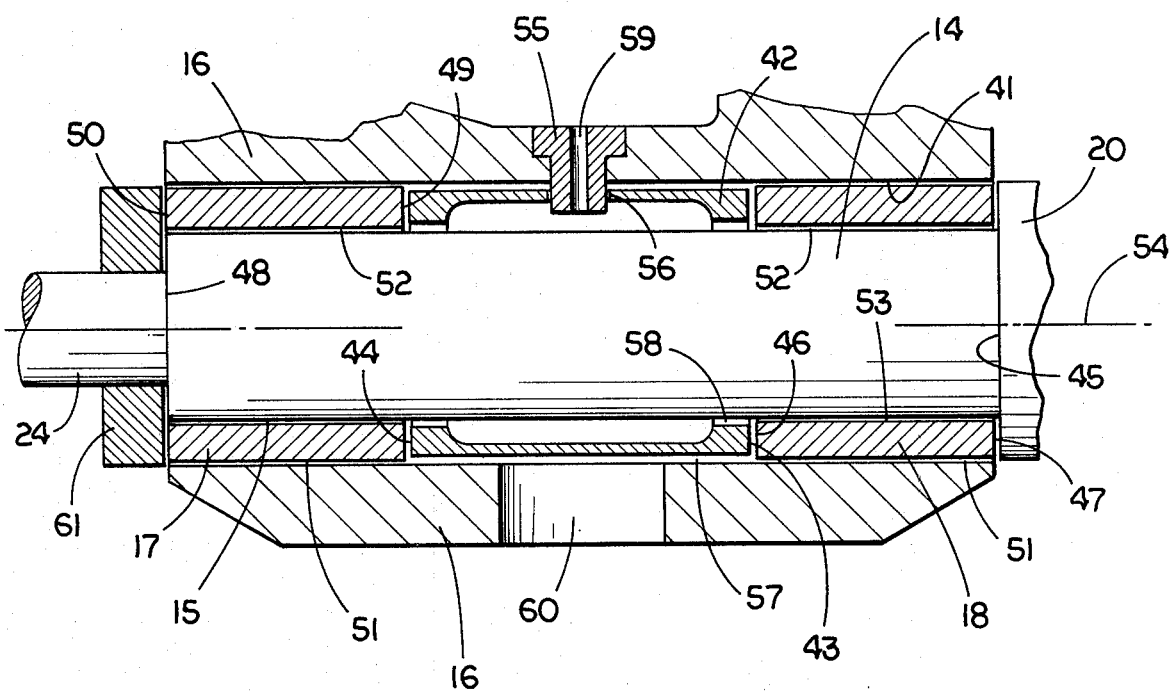
FIG. 2 is an enlarged, cross-sectional view of a preferred embodiment of the bearing structure of the present invention.

The bearing structure of the present invention is shown particularly in FIG. 2. The present invention provides a bearing assembly which is adapted for supporting a rotatable shaft which is subjected to axial thrust loads in either direction. In a particularly preferred embodiment, the bearing structure of the present invention is used in conjunction with a turbocharger assembly as previously described. It is to be understood, however, that the bearing structure of the present invention is useful in conjunction with a variety of turbocharger assemblies, and is not to be limited to use with the particular turbocharger described herein. The description of the present turbocharger assembly is provided for purposes of describing a preferred embodiment of the present invention, and further details on a similar turbocharger assembly may be found in U.S. Pat. No. 4,181,466 issued on Jan. 1, 1980, based upon U.S. Pat. application Ser. No. 778,372, filed Mar. 17, 1977, the relevant portions of which are expressly incorporated by reference herein.

Referring in particular to FIG. 2, an enlarged view of a preferred embodiment of the bearing structure of the present invention is provided. The bearing housing 16 defines a cylindrical bore 41. Thrust sleeve 42 has a generally cylindrical configuration and is received within bore 41. Thrust sleeve 42 includes end bearing surfaces 43 and 44. Bearing sleeve 18 includes end bearing surfaces 46 and 47, and is received within cylindrical bore 41 adjacent thrust sleeve 42. Bearing sleeve 17 includes end bearing surfaces 49 and 50 and is received within cylindrical bore 41 adjacent the opposite end of thrust sleeve 42.

In usual fashion, the bearing sleeves 18 and 17 have outer diameters slightly less than the diameter of cylindrical bore 41 to provide for normal rotation of the bearings. Similarly, the inside diameters of bearing sleeves 18 and 17 are sized to be slightly greater than the outside diameter of the bearing portion 15 of shaft 14. Moreover, the annular gaps 51 between the bearing housing 16 and the bearing sleeves 18 and 17, and the annular gaps 52 between the bearing sleeves and the bearing portion 15, are sized in respect to the required bearing characteristics of the system. For example, the shaft in a turbocharger assembly may rotate at speeds exceeding 150,000 revolutions per minute. The sizing of the gaps 51 and 52 is selected in view of the bearing requirements for the system and with particular view toward the rotational speeds for the shaft and the characteristics of the bearing materials and the bearing fluid 53 received within the gaps.

Since the gaps 51 and 52 are present and contain the bearing fluid 53, the bearing sleeves 18 and 17 will shift from their normal, coaxial positioning with respect to the bearing housing 16. Preferably the bearing sleeves are positioned such that the cylindrical bore 41, the shaft 14 and the bearing sleeves have a common central axis 54.

In operation, shaft 14 will move out of the coaxial alignment with bore 41, and similarly the bearing sleeves 18 and 17 will move out of their coaxial positioning. It is a particular feature of the present invention that the thrust sleeve 42 is permitted to displace from its normal, coaxial position to an extent corresponding to displacement by the bearing sleeves and shaft. When a non-coaxial positioning of the bearing sleeves occurs, the end bearing surfaces are no longer positioned normal to the axis 54 of cylindrical bore 41. Of course, it is highly preferable that associated bearing surfaces, such as the end bearing surfaces 46 and 43 of bearing sleeve 18 and thrust sleeve 42, respectively, be parallel such that the axial thrust loads are evenly transmitted. This parallel relationship does not exist in prior art constructions when the bearing sleeves are not parallel to the bore axis since the stationary thrust bearing member has previously been fixedly mounted within the bore to have its end bearing surfaces positioned normal to the bore axis. By securing the thrust sleeve 42 within the cylindrical bore to be movable from its normal, coaxial position, the parallel relationship between the respective end bearing surfaces can be maintained.

In view of this objective, retaining means are provided for retaining the thrust sleeve 42 to the bearing housing 16 such that the thrust sleeve is movable from its normal position coaxial with the cylindrical bore. To accommodate the non-coaxial positioning of the thrust sleeve 42, suitable gaps are provided between the bearing housing 16 and outer diameter of the thrust sleeve, and also between the inner diameter of the thrust sleeve and the outer diameter of the bearing portion of the shaft. The gaps 57 and 58 are typically larger in size as compared to the gaps 51 and 52, respectively.

Means are provided for distributing the bearing fluid to the cylindrical bore. The bearing fluid may be provided in a variety of known fashions, such as the inclusion of suitable apertures in the bearing housing directing the fluid to the bearing sleeves and the thrust sleeve. In a preferred embodiment, the thrust pin 55 is utilized to secure the thrust sleeve to the bearing housing. In this embodiment, it is preferred that the thrust pin define a central aperture 59 extending through the pin and thus communicating with the interior of the cylindrical bore at a location between the thrust sleeve and the bearing portion of the shaft. The bearing fluid may then be distributed throughout the bearing assembly and permitted to exit through a port 60. The retaining means also provides for retaining the thrust sleeve to the bearing housing to limit rotation and to limit axial displacement of the thrust sleeve with respect to the bearing housing.

The retaining means preferably comprises a thrust pin 55 received within an aperture defined by housing 16. Thrust sleeve 42 then preferably includes an aperture 56 aligned with the bearing housing aperture and receiving a portion of the thrust pin therein. Aperture 56 is sized slightly greater than the thrust pin portion received therein. This sizing permits the thrust sleeve 42 to pivot slightly about thrust pin 55 and thereby to move to and from coaxial alignment with cylindrical bore 41.

The described retaining means provides for the thrust sleeve to be retained within the bearing housing in a manner to limit rotation and to limit axial displacement of the thrust sleeve with respect to the bearing housing. In addition, the retaining means provides for a transfer of the axial thrust load from the thrust sleeve to the bearing housing. The retaining means further permits a degree of movement of the thrust sleeve with respect to the bore axis to correspond with non-coaxial positioning of the bearing sleeves, or more particularly the positioning of the end bearing surfaces other than normal with the bore axis. In this manner, the end bearing surfaces 43 and 44 of the thrust sleeve are maintained in a parallel position to the end bearing surfaces 46 and 49 of the bearing sleeves 18 and 17, respectively.

The application of an axial thrust load by either bearing sleeve while in a non-coaxial position will result in a corresponding positioning of the thrust sleeve to render the associated end bearing surfaces parallel. The transmission of the thrust load is thereby evenly distributed and uniform wear on the bearing surfaces is accomplished. The retaining means permits movement of the thrust sleeve within the bearing housing to provide substantial parallel alignment of end bearing surface 43 with the end bearing surface 46 of bearing sleeve 18 upon transmission of axial thrust from said bearing sleeve to the thrust sleeve, and particularly in response to different orientations of that bearing sleeve. The retaining means further permits movement of the thrust sleeve within the bearing housing to provide substantial parallel alignment of the end bearing surface 44 with the end bearing surface 49 of bearing sleeve 17 upon transmission of axial thrust from bearing sleeve 17 to the thrust sleeve, and particularly in response to different orientations of the bearing sleeve 17. Radial freedom of the thrust sleeve also provides squeeze film effect which is beneficial in suppressing vibrations of the shaft in combination with the rotor and turbine wheels.

In a particularly preferred embodiment, the dimensions for the bearing structure are as follows. The difference between the outer diameter of the thrust sleeve 42 and the diameter of the cylindrical bore 41 is preferably from about 0.002 inches to about 0.006 inches, and more preferably is about 0.004 inches. The inner diameter of the thrust sleeve at the locations of the end bearing surfaces is preferably from about 0.003 to about 0.005 inches, and more preferably about 0.004 inches, greater than the outer diameter of the shaft 14 at these locations. The difference between the outer diameter of the bearing sleeves and the diameter of the cylindrical bore is preferably about 0.003 inches. The inner diameter of the bearing sleeves is preferably about 0.002 inches greater than the outer diameter of the shaft received therein. The outer diameter of the shaft bearing portion 14 is nominally between 0.35 and 0.5 inches in the preferred embodiment.

Further with respect to the above-described embodiment, it is preferred that the aperture 56 in thrust sleeve 42 have a diameter which is from about 0.001 inches to about 0.003 inches, more preferably about 0.002 inches, greater than the outer diameter of the portion of the thrust pin received therein. The total of the axial dimensions of the gaps between the thrust runner, bearing sleeves, thrust sleeve and shoulder 45 is preferably from about 0.003 inches and about 0.007 inches.

The axial length of the thrust sleeve 42 is preferably from about 0.5 to about 1.5 times the diameter of the cylindrical bore in order to facilitate alignment of the end bearing surfaces upon movement of the thrust sleeve. In addition, it is preferable that when the thrust pin is used to retain the thrust sleeve within the bearing housing the thrust pin is received within the aperture 56 located at the axial midpoint of the thrust sleeve.

Means are provided for transmitting thrust from the shaft 14 to either of the bearing sleeves 17 and 18. Shaft 14 includes a bearing portion 15 and an enlarged portion 20. Enlarged portion 20 defines a shoulder 45 which is adjacent and positioned to bear against the end bearing surface 47 of bearing sleeve 18. Shaft 14 further includes a reduced portion 24, thereby providing a shoulder 48 at the juncture with the bearing portion 15. Shoulder 48 is located generally in line with the end bearing surface 58 of bearing sleeve 17, and faces in the same direction as the end bearing surface 50. A thrust runner 61 is secured to the shaft adjacent the shoulder 48. Thrust runner 61 extends outwardly of the shoulder 48 and includes a portion positioned to bear against the end bearing surface 50 of the bearing sleeve 17.

In another embodiment, the present invention provides a bearing structure which may be utilized to bear thrust loads in a single direction. In certain circumstances, the thrust loads for a rotatable shaft may occur primarily or exclusively in a single direction, or there may be substantial differences in the amount of load applied in opposite directions. In these circumstances, for example, it may be desirable to utilize the bearing structure of the present invention to receive the thrust load in one of the directions while using a different arrangement to receive the thrust load in the opposite direction. Modification of the embodiment of FIG. 2 may be readily accomplished to adapt the present invention for this type of use. For example, a thrust bearing plate could be positioned to extend inwardly of thrust runner 61 and thus to directly receive the thrust load from the runner 61. As an example, the primary thrust load in a turbocharger is applied from the turbine wheel which is typically mounted upon the enlarged portion 20 of the shaft. It is possible to use the present invention to receive the thrust load from only the turbine or only the impeller.

The present invention provides a bearing structure which has several advantages. The bearing elements are received within a cylindrical bore within a bearing housing, thus facilitating construction due to the use of a single, cylindrical bore. The self-aligning thrust sleeve assures substantial parallelism between the mutually-facing end bearing surfaces of the thrust sleeve and the bearing sleeves. This parallelism provides a more even distribution of thrust loads between the associated members, and therefore provides better wear characteristics for the elements. The manufacturing tolerances are thereby made simpler, and this is advantageous. In addition, absense of a press fit component permits the use of cast iron as the bearing housing instead of steel, which is a substantial cost saving. The bearing structure is also more efficient in terms of power loss of the shaft compared, for example, to fixed thrust sleeve systems. The speed ratio between the bearing sleeves and the shaft is typically about 0.2 to 0.3. The Sommerfeld number increases typically by a ratio of 1.2 to 1.3. The combination of the higher Sommerfeld number and lower relative velocities between the bearing sleeves and the shaft will typically produce a decrease by about 0.7 to 0.8 of the power loss attributable to friction in the bearing.

While there have been described above the principles of this invention in connection with specific apparatus, it is to be clearly understood that this description is made only by way of example and not as a limitation to the scope of the invention.

What is claimed is:

1. A bearing structure for a rotatable shaft subjected to axial thrust loads which comprises:
    a bearing housing defining a cylindrical bore;
    a thrust sleeve received within the cylindrical bore of said bearing housing and having first and second end bearing surfaces, said thrust sleeve having an outer diameter smaller than the diameter of the cylindrical bore in said bearing housing;
    a first bearing sleeve received within the bore of said bearing housing and having a first end bearing surface positioned adjacent the first end bearing surface of said thrust sleeve, said first bearing sleeve further having a second end bearing surface;
    a second bearing sleeve received within the bore of said housing and having a first end bearing surface positioned adjacent the second end bearing surface of said thrust sleeve, said second bearing sleeve further having a second end bearing surface;
    a shaft rotatably received within said thrust sleeve and said first and second bearing sleeves, said shaft having a diameter smaller than the inside diameter of said thrust sleeve;
    first thrust-transmitting means associated with said shaft for transmitting axial thrust from said shaft to the second end bearing surface of said first bearing sleeve;
    second thrust-transmitting means associated with said shaft for transmitting axial thrust from said shaft to the second end bearing surface of said second bearing sleeve; and
    retaining means for retaining said thrust sleeve within said housing to limit rotation and to limit axial displacement of said thrust sleeve, said retaining means further being for permitting movement of said thrust sleeve within said bearing housing to provide substantial parallel alignment of the first end bearing surface of said thrust sleeve with the first end bearing surface of said first bearing sleeve upon transmission of axial thrust from said first bearing sleeve to said thrust sleeve and in response to different orientations of said first bearing sleeve, said retaining means further being for permitting movement of said thrust sleeve within said bearing housing to provide substantial parallel alignment of the second end bearing surface of said thrust sleeve with the first end bearing surface of said second bearing sleeve upon transmission of axial thrust from said second bearing sleeve to said thrust sleeve and in response to different orientations of said second bearing sleeve.

2. The bearing structure of claim 1 in which said retaining means comprises said bearing housing and said thrust sleeve defining aligned apertures, said retaining means further comprising a thrust pin secured within the aperture in said bearing housing, said thrust pin extending into the aperture in said thrust sleeve and being sized smaller than the aperture in said thrust sleeve to limit rotation and axial displacement of said thrust sleeve relative said bearing housing and to permit the movement of said thrust sleeve to provide substantial alignment of the end bearing surfaces of said thrust sleeve and said bearing sleeves.

3. The bearing structure of claim 2 in which the difference between the outer diameter of said thrust sleeve and the diameter of the cylindrical bore in said bearing housing is from about 0.002 inches to about 0.006 inches.

4. The bearing structure of claim 3 in which the inner diameter of said thrust sleeve at the locations of the end bearing surfaces is from about 0.003 inches to about 0.005 inches greater than the outer diameter of said shaft at said locations.

5. The bearing structure of claim 3 in which the difference between the outer diameter of said thrust sleeve and the diameter of the cylindrical bore in said bearing housing is about 0.004 inches.

6. The bearing structure of claim 5 in which the outer diameter of said bearing sleeves is about 0.003 inches less than the diameter of the cylindrical bore in said bearing housing.

7. The bearing structure of claim 6 in which the inner diameter of said thrust sleeve at the locations of the end bearing surfaces is from about 0.003 inches to about 0.005 inches greater than the outer diameter of said shaft at said locations.

8. The bearing structure of claim 2 in which the axial length of said thrust sleeve is from about 0.5 to about 1.5 times the diameter of the cylindrical bore in said bearing housing.

9. The bearing structure of claim 2 in which the aperture in said thrust sleeve in which a portion of said thrust pin is received is located at the axial midpoint of said thrust sleeve.

10. The bearing structure of claim 9 in which said first thrust-transmitting means comprises said shaft defining a shoulder adjacent and positioned to bear against the second end bearing surface of said first bearing sleeve.

11. The bearing structure of claim 10 in which said second thrust-transmitting means comprises said shaft defining a second shoulder at the location of the second end bearing surface of said second bearing sleeve, the second shoulder facing in the same direction as the second end bearing surface of said second bearing sleeve, said second thrust-transmitting means further comprising a thrust runner secured to said shaft adjacent the second shoulder, the thrust runner extending outwardly of the second shoulder and including a portion positioned to bear against the second end bearing surface of said second bearing sleeve.

12. The bearing structure of claim 11 in which said thrust pin defines an aperture extending therethrough to provide a pathway in communication with the cylindrical bore in said bearing house for passage of bearing fluid therethrough.

13. A bearing structure for a rotatable shaft subjected to axial thrust loads which comprises:
a bearing housing defining a cylindrical bore;
a thrust sleeve received within the cylindrical bore of said bearing housing and having first and second end bearing surfaces, said thrust sleeve having an outer diameter smaller than the diameter of the cylindrical bore in said bearing housing, said thrust sleeve and said bearing housing defining aligned apertures;
a first bearing sleeve received within the bore of said bearing housing and having a first end bearing surface positioned adjacent the first end bearing surface of said thrust sleeve, said first bearing sleeve further having a second end bearing surface;
a second bearing sleeve received within the bore of said housing and having a first end bearing surface positioned adjacent the second end bearing surface of said thrust sleeve, said second bearing sleeve further having a second end bearing surface;
a shaft rotatably received within said thrust sleeve and said first and second bearing sleeves, said shaft having a diameter smaller than the inside diameter of said thrust sleeve;
first thrust-transmitting means associated with said shaft for transmitting axial thrust from said shaft to the second end bearing surface of said first bearing sleeve;
second thrust-transmitting means associated with said shaft for transmitting axial thrust from said shaft to the second end bearing surface of said second bearing sleeve; and
a thrust pin secured within the aperture in said bearing housing, said thrust pin including a portion extending within and being smaller than the aperture in said thrust sleeve, said thrust sleeve being movable about said thrust pin in response to transmission of axial thrust from one of said bearing sleeves to provide substantial alignment of the first end bearing surface of said one of said bearing sleeves and the associated end bearing surface of said thrust sleeve.

14. A bearing structure for a rotatable shaft subjected to axial thrust loads which comprises:
a bearing housing defining a cylindrical bore;
a thrust sleeve received within the cylindrical bore of said bearing housing and having an end bearing surface, said thrust sleeve having an outer diameter smaller than the diameter of the cylindrical bore in said bearing housing;
a bearing sleeve received within the bore of said bearing housing and having a first end bearing surface positioned adjacent the end bearing surface of said thrust sleeve, said bearing sleeve further having a second end bearing surface;
a shaft rotatably received within said thrust sleeve and said bearing sleeve, said shaft having a diameter smaller than the inside diameter of said thrust sleeve;
thrust-transmitting means associated with said shaft for transmitting axial thrust from said shaft to the second end bearing surface of said bearing sleeve; and
retaining means for retaining said thrust sleeve within said housing to limit rotation and axial displacement of said thrust sleeve, said retaining means further being for permitting movement of said thrust sleeve within said bearing housing to provide substantial parallel alignment of the end bearing surface of said thrust sleeve with the first end bearing surface of said bearing sleeve upon transmission of axial thrust from said bearing sleeve to said thrust sleeve and in response to different orientations of said bearing sleeve.

15. A turbocharger assembly which comprises:
a bearing housing defining a cylindrical bore;
a thrust sleeve received within the cylindrical bore of said bearing housing and having first and second end bearing surfaces, said thrust sleeve having an outer diameter smaller than the diameter of the cylindrical bore in said bearing housing;
a first bearing sleeve received within the bore of said bearing housing and having a first end bearing surface positioned adjacent the first end bearing surface of said thrust sleeve, said first bearing sleeve further having a second end bearing surface;
a second bearing sleeve received within the bore of said housing and having a first end bearing surface positioned adjacent the second end bearing surface of said thrust sleeve, said second bearing sleeve further having a second end bearing surface;
a shaft rotatably received within said thrust sleeve and said first and second bearing sleeves, said shaft having a diameter smaller than the inside diameter of said thrust sleeve;
first thrust-transmitting means associated with said shaft for transmitting axial thrust from said shaft to the second end bearing surface of said first bearing sleeve;
second thrust-transmitting means associated with said shaft for transmitting axial thrust from said shaft to the second end bearing surface of said second bearing sleeve;
retaining means for retaining said thrust sleeve within said housing to limit rotation and axial displacement of said thrust sleeve, said retaining means further being for permitting movement of said thrust sleeve within said bearing housing to provide substantial parallel alignment of the first end bearing surface of said thrust sleeve with the first end bearing surface of said first bearing sleeve upon transmission of axial thrust from said first bearing sleeve to said thrust sleeve and in response to different orientations of said first bearing sleeve, said retaining means further being for permitting movement of said thrust sleeve within said bearing housing to provide substantial parallel alignment of the second end bearing surface of said thrust sleeve with the first end bearing surface of said second bearing sleeve upon transmission of axial thrust from said second bearing sleeve to said thrust sleeve and in response to different orientations of said second bearing sleeve;

a turbine assembly including a turbine housing mounted to the bearing housing, said turbine assembly further including a turbine received within the turbine housing and mounted to said shaft; and a compressor assembly including a compressor housing mounted to said bearing housing, said compressor assembly further including an impeller received within the compressor and mounted to said shaft.

* * * * *